(12) United States Patent
Yoshida et al.

(10) Patent No.: US 8,611,714 B2
(45) Date of Patent: Dec. 17, 2013

(54) OPTICAL FIBER AND METHOD FOR MANUFACTURING SAME

(75) Inventors: Hirotsugu Yoshida, Kyoto (JP); Ryosuke Nakao, Kyoto (JP); Hiroka Inabe, Kyoto (JP); Tazuru Okamoto, Kyoto (JP); Yuki Masabe, Kyoto (JP); Masato Aoyama, Kyoto (JP); Yasuhiro Koike, Yokohama (JP)

(73) Assignees: Sekisui Chemical Co., Ltd., Osaka (JP); Keio University, Tokyo (JP)

( * ) Notice: Subject to any disclaimer, the term of this patent is extended or adjusted under 35 U.S.C. 154(b) by 124 days.

(21) Appl. No.: 13/383,041

(22) PCT Filed: Jul. 5, 2010

(86) PCT No.: PCT/JP2010/061378
§ 371 (c)(1),
(2), (4) Date: Jan. 9, 2012

(87) PCT Pub. No.: WO2011/004785
PCT Pub. Date: Jan. 13, 2011

(65) Prior Publication Data
US 2012/0114291 A1 May 10, 2012

(30) Foreign Application Priority Data

Jul. 10, 2009 (JP) ................. 2009-163317
Dec. 25, 2009 (JP) ................. 2009-293955
Apr. 6, 2010 (JP) ................. 2010-087570

(51) Int. Cl.
*G02B 6/02* (2006.01)
(52) U.S. Cl.
USPC ............................ 385/123; 385/124; 385/144

(58) Field of Classification Search
USPC .................................. 385/123–128, 141–145
See application file for complete search history.

(56) References Cited

U.S. PATENT DOCUMENTS

| 6,576,166 | B1 | 6/2003 | Perrin et al. | |
|---|---|---|---|---|
| 8,422,844 | B2 * | 4/2013 | Tsukamoto et al. | 385/128 |
| 2004/0197061 | A1 * | 10/2004 | Ogura et al. | 385/123 |
| 2012/0027369 | A1 * | 2/2012 | Yoshida et al. | 385/123 |

FOREIGN PATENT DOCUMENTS

| JP | 62-147404 | 7/1987 |
|---|---|---|
| JP | 4-243203 | 8/1992 |
| JP | 2001-59912 | 3/2001 |

OTHER PUBLICATIONS

International Search Report issued Jul. 27, 2010 in International (PCT) Application No. PCT/JP2010/061378.

* cited by examiner

*Primary Examiner* — Daniel Petkovsek
(74) *Attorney, Agent, or Firm* — Wenderoth, Lind & Ponack, L.L.P.

(57) ABSTRACT

[Object] The present invention has the object of providing an optical fiber enabling high-speed communication, that exhibits superior transparency and excellent flexibility, and that includes trichloroethyl methacrylate as a main component of the core portion monomer.
[Means for Solving Problem] An optical fiber configured from a core portion and a cladding portion disposed on an outer periphery of the core portion, wherein the core portion is formed by a main constituent component of a polymer of monomers that include at least 70 wt % of trichloroethyl methacrylate (TCEMA), the cladding portion is formed by a main constituent component of a polymer of monomers which include at least 20 wt % of methyl methacrylate (MMA).

5 Claims, No Drawings

OPTICAL FIBER AND METHOD FOR MANUFACTURING SAME

This application is a U.S. national stage of International Application No. PCT/JP2010/061378 filed Jul. 5, 2010.

TECHNICAL FIELD

The present invention relates to an optical fiber and a method for manufacturing the same, and more particularly relates to an optical fiber that has a core portion made from a polymer of the monomers which are trichloroethyl methacrylate (TCEMA) exhibiting superior transparency and which are used as a main component, and a method for manufacturing the same.

BACKGROUND ART

An optical fiber that includes methacrylic resin such as polymethyl methacrylate or the like as a core portion has been known in the past. Such plastic optical fiber has a variety of advantage such as good flexibility, light weight and good processability, and that is easy to manufacture as a large core diameter fiber and allows to manufacture at low cost.

Generally, a halogen-containing alkyl(meth)acrylate resin with few carbon-hydrogen bonds exhibiting light absorption in the near-infrared to infrared range (600 to 1550 nm) should theoretically exhibit superior transparency.

For example, the absorption loss due to carbon-hydrogen bonds in polymethyl methacrylate at a wavelength of 650 nm is estimated at 96 dB/km. In contrast, the absorption loss due to carbon-hydrogen bonds in polymethyl α-chloroacrylate is estimated at 62 dB/km. It has been proposed to obtain a plastic optical fiber with superior thermal resistance and humidity resistance by use of a configuration in which the component forming the core portion polymer includes methyl α-chloroacrylate as a main component, one component is a halogen-containing alkyl(meth)acrylate, and a polymer having a diffractive index that is lower than the core portion forms the cladding portion (for example, Japanese Patent Application Laid-Open No. 62-147404).

Furthermore, the absorption loss due to carbon-hydrogen bonds in polytrichloroethyl methacrylate is estimated at 49 dB/km.

However, when an optical fiber is actually configured having a main component of poly trichloroethyl methacrylate in both of the core portion and the cladding portion, the problem arises that flexibility is extremely poor and use in relation to communication applications is not possible.

DISCLOSURE OF THE INVENTION

Problem to be Solved

The present invention is proposed in light of the above problems and has the object of providing an optical fiber enabling high-speed communication, that exhibits superior transparency and excellent flexibility, and that includes trichloroethyl methacrylate as a main component of the core portion monomer.

Means for Solving the Problem

An optical fiber according to the present invention and a method of manufacture therefore include the following inventions.

(1) An optical fiber configured from a core portion and a cladding portion disposed on an outer periphery of the core portion, wherein the core portion is formed by a main constituent component of a polymer of monomers that include at least 70 wt % of trichloroethyl methacrylate (TCEMA), the cladding portion is formed by a main constituent component of a polymer of monomers which include at least 20 wt % of methyl methacrylate (MMA).

(2) An optical fiber according to (1), wherein the core portion is formed by a main constituent component of a polymer of structural units that are derived from TCEMA and at least one monomer selecting from the group consisting of methyl methacrylate (MMA), methyl acrylate (MA), N-cyclohexyl maleimide (N-cHMI), cyclohexyl acrylate (cHA), trichloroethyl acrylate (TCEA), isobornyl acrylate (iBoA) and cyclohexyl methacrylate (cHMA).

(3) An optical fiber according to (1) or (2), wherein the cladding portion is formed by a main constituent component of a polymer of structural units that are derived from MMA and at least one monomer selecting from the group consisting of TCEMA, MA, N-cHMI, cHA, TCEA, iBoA and cHMA.

(4) An optical fiber configured from a core portion and a cladding portion disposed on an outer periphery of the core portion, wherein the core portion is formed by a main constituent component of a polymer of monomers that include at least 70 wt % of trichloroethyl methacrylate (TCEMA), an outer periphery of the cladding portion is covered by a plastic having a main component of polycarbonate.

(5) An optical fiber according to claim (4), wherein the core portion is formed by a main constituent component of a polymer of structural units that are derived from TCEMA and at least one monomer selecting from the group consisting of MMA, MA, N-cHMI, cHA, TCEA, iBoA and cHMA.

(6) An optical fiber according to claim (4) or (5), wherein the cladding portion is formed by a main component of a polymer of structural units that include at least 50 wt % of TCEMA and no more than 50 wt % of at least one monomer selecting from the group consisting of MMA, MA, N-cHMI, cHA, TCEA, iBoA, cHMA.

(7) An optical fiber according to any one of (1) to (6), wherein the core portion include a dopant and has a diffractive index distribution.

(8) An optical fiber according to (7), wherein the dopant includes one or more selecting from the group consisting of diphenyl sulfide (DPS), triphenyl phosphate (TPP), diphenyl sulfone (DPSO) and tris-2-ethylhexylphosfate (TOP).

(9) A method of manufacturing an optical fiber configured from a core portion and a cladding portion disposed on an outer periphery of the core portion, and the core portion is formed by a main constituent component of a polymer which has structural units derived from TCEMA and at least one monomer selecting from the group consisting of MA, N-cHMI, cHA, TCEA, iBoA and cHMA, and which main components are TCEMA, the method includes the step of imparting a diffractive index distribution to at least the core portion by a melt-extrusion dopant diffusion method.

Effect of the Invention

According to the present invention, it is possible to obtain an optical fiber enabling high-speed communication, and that exhibits superior transparency and excellent flexibility.

DETAILED DESCRIPTION OF THE PREFERRED EMBODIMENTS

The optical fiber according to the present invention is configured from a core portion and a cladding portion disposed on an outer periphery of the core portion. However the present specification also includes a reference to an optical fiber including a covering layer that covers the outer periphery of the cladding portion.

In the present invention, the terms core portion and cladding portion are used such that the layer constituted by the polymer serving as the main component of the core is called the core portion, and the layer constituted by the polymer serving as the main component of the cladding is called the cladding portion, regardless of core and cladding in an optical sense in the optical fiber.

Optical fibers are normally classified as either multimode optical fibers or single mode optical fibers. The optical fiber of the present invention has, in particular, an advantage over the multimode optical fibers.

Multimode optical fibers are further classified as a step index (SI) type and a graded index (GI) type that has a refractive index distribution. The optical fiber of the present invention is preferably the GI type.

The term "refractive index distribution" as used here means that the refractive index changes in steps at a constant width or on a curve close to a parabola, from the center of the fiber outward in the radial direction. It is especially preferable if the refractive index decreases from the center outward in the radial direction. A refractive index distribution such as this raises the communication speed.

Also, the refractive index may first decrease in a curve or steps and then increase in a curve or steps from the center of the optical fiber outward in the radial direction. In this case, it is preferable if the refractive index is higher in the core portion than in the outermost layer of the cladding portion, but the outermost layer of the cladding portion may have a higher refractive index than the core portion.

An aspect of the optical fiber according to the present invention includes an optical fiber A that has a core portion configured by a specific component and a cladding portion that is configured by a specific component.

In such optical fiber, the polymer that forms the core portion is favorably formed by inclusion of trichloroethyl methacrylate (hereinafter sometimes abbreviated as "TCEMA") as a main component. In particular, the polymer is preferably formed by inclusion of TCEMA and at least one monomer selecting from the group consisting of methyl methacrylate (hereinafter sometimes abbreviated as "MMA"), methyl acrylate (hereinafter sometimes abbreviated as "MA"), N-cyclohexyl maleimide (hereinafter sometimes abbreviated as "N-cHMI"), cyclohexyl acrylate (hereinafter sometimes abbreviated as "cHA"), trichloroethyl acrylate (hereinafter sometimes abbreviated as "TCEA"), isobornyl acrylate (hereinafter sometimes abbreviated as "iBoA") and cyclohexyl methacrylate (hereinafter sometimes abbreviated as "cHMA") as an arbitrary component. As used herein, "main component" denotes the highest weight component in the total components that configure the polymer (same applied hereafter).

The core portion is favorably formed by a main constituent component of a polymer that uses at least 70 wt % of TCEMA in the total monomer that constitutes the polymer. As used herein, "main constituent component" denotes the highest weight component in the total components that configure the core portion, and it includes the meaning that other polymers, dopants described below, additives and the like in addition to the main constituent component may be included (same applied hereafter).

A polymer derived from monomers including at least 70 wt % TCEMA may be a polymer using only TCEMA, or may be a polymer using no more than 95 wt % of TCEMA in the total monomer. In particular, the TCEMA in the core portion is preferably 80 to 95 wt %, 80 to 100 wt %, and 100 wt % with respect to total monomer.

This is due to the fact that when a polymer using a proportion of at least 70 wt % of TCEMA forms the core portion as a main constituent component, superior transparency is obtained and the communication distance can be increased.

When MMA is used as an arbitrary component, MMA is favorably used at no more than 30 wt % (and preferably no more than 20 wt %). When used in that range, the diffractive index of the core portion can be suitably adjusted, and the communication speed can be improved while maintaining transparency and flexibility.

When MA, cHA, TCEA, iBoA or cHMA is used as an arbitrary component, MA, cHA, TCEA, iBoA and cHMA are favorably used at no more than 10 wt % (and preferably no more than 8 wt %), respectively.

When used MA in that range, the diffractive index of the core portion can be suitably adjusted, and the communication speed can be improved while maintaining transparency and flexibility.

When used cHA, TCEA and cHMA, respectively, in these range, use is enabled as an optical fiber that has excellent transparency and flexibility.

When used iBoA in that range, the glass transition temperature of the core portion can be raised, and use is enabled as an optical fiber that has excellent heat resistance while maintaining good transparency and flexibility.

When N-cHMI is used as an arbitrary component, N-cHMI is preferably used at no more than 20 wt % (and more preferably no more than 15 wt %). When used in this range, use is enabled as an optical fiber that has excellent heat resistance while maintaining good transparency and flexibility.

When using a monomer including at least two arbitrary components selected from the group consisting of MMA, MA, N-cHMI, cHA, TCEA, iBoA and cHMA, the total amount thereof is favorably no more than 30 wt % of the total monomer, and is preferably no more than 20 wt %.

The core portion is preferably formed substantially from only a polymer including at least 70 wt % of TCEMA as a polymer component.

The polymer that configures the cladding portion is favorably formed by inclusion of MMA. In particular, it is favorably be formed that includes MMA and at least one monomer as an arbitrary component selected from the group consisting of TCEMA, MA, N-cHMI, cHA, TCEA, iBoA and cHMA. It is preferably a polymer derived from MMA and those arbitrary components as a main constituent component. As used herein, "main constituent component" denotes the highest weight component in the total components that configure the cladding portion, and it includes the meaning that other polymers, the dopants described below, additives and the like in addition to the main constituent component may be included (same applied hereafter).

The cladding portion is favorably formed by a polymer including at least 20 wt % of MMA in the total monomer. The cladding portion may be formed by a polymer using only MMA, or may be formed by a polymer using no more than 95 wt % of MMA in the total monomer. In particular, the MMA in the cladding portion is preferably 30 to 95 wt %, and 30 to 100 wt % with respect to total monomer.

When the cladding portion is formed by a polymer using MMA at a proportion of at least 20 wt % as a main constituent component, superior flexibility and a suitable reduction in the diffraction index to less than the core portion can be obtained, bending loss can be suppressed and the communication speed can be improved.

When TCEMA is used as an arbitrary component, TCEMA is favorably used at no more than 80 wt % (and preferably no more than 70 wt %). When used in that range, the diffractive index of the cladding portion can be suitably adjusted, the glass transition temperature of the cladding portion can be raised, and use is enabled as an optical fiber that has excellent communication speed and the heat resistance while maintaining transparency and flexibility.

When MA, cHA, TCEA, iBoA or cHMA is used as an arbitrary component, MA, cHA, TCEA, iBoA and cHMA are favorably used at no more than 10 wt % (and preferably no more than 8 wt %), respectively.

When MA, cHA, TCEA, iBoA or cHMA used in this range, respectively, the diffractive index of the cladding portion can be suitably adjusted, and it is possible to use as an optical fiber that has excellent communication speed while maintaining transparency and flexibility.

When used iBoA in that range, the diffractive index of the cladding portion can be suitably adjusted, the glass transition temperature of the cladding portion can be raised, and use is enabled as an optical fiber that has excellent communication speed and heat resistance while maintaining good transparency and flexibility.

When N-cHMI is used as an arbitrary component, N-cHMI is favorably used at no more than 20 wt % (and preferably no more than 15 wt %). When used in this range, the diffractive index of the cladding portion can be suitably adjusted, the glass transition temperature of the cladding portion can be raised, and use is enabled as an optical fiber that has excellent heat resistance and communication speed while maintaining good transparency and flexibility.

When using a monomer including at least two arbitrary components selected from the group consisting of TCEMA, MA, N-cHMI, cHA, TCEA, iBoA and cHMA, the total amount thereof is favorably no more than 80 wt % of the total monomer.

The cladding portion is preferably formed from only a polymer including MMA and at least one components selected from the group consisting of TCEMA, MA, N-cHMI, cHA, TCEA, iBoA and cHMA.

Although the constituent component configuring the core portion and the cladding portion may be the same composition, that is to say, have the same constituent monomers and proportion thereof, it preferably has a different composition.

Another aspect of an optical fiber according to the present invention includes an optical fiber B that has a covering member (hereinafter referred to as "overcladding") that covers the outer periphery of the core portion and the cladding portion configured by a specified component.

In such optical fiber, the polymer forming the core portion is favorably formed by inclusions of TCEMA as a main component, in particular, it is preferably formed by inclusions of at least one monomer as an arbitrary component selecting from MMA, MA, N-cHMT, cHA, TCEA, iBoA and cHMA.

The plastic covering member that covers the outer periphery of the cladding portion is preferably formed from a plastic having a main component of polycarbonate.

The core portion is favorably formed from the same material as the core portion in the optical fiber A that includes a core portion configured from the specified component and a cladding portion configured from the specified component as described above.

The cladding portion is favorably formed by a polymer including 50 to 100 wt % of TCEMA. In particular, TCEMA in the cladding portion is preferably contained 50 to 90 wt %, 60 to 100 wt %, and 60 to 90 wt % with respect to total monomer.

When the arbitrary component is used, at least one monomer that is 0 to 50 wt %, preferably 0 to 40 wt % of MMA, 0 to 10 wt %, preferably 0 to 8 wt % of MA, 0 to 20 wt %, preferably 0 to 15 wt % of N-cHMI, 0 to 10 wt %, preferably 0 to 8 wt % of cHA, 0 to 10 wt %, preferably 0 to 8 wt % of TCEA, 0 to 10 wt %, preferably 0 to 8 wt % of iBoA, 0 to 10 wt %, preferably 0 to 8 wt % of cHMA is preferable.

When at least two monomers as the arbitrary components selected from the group consisting of MMA, MA, N-cHMI, cHA, TCEA, iBoA and cHMA are used, total amount of these is favorably used mo more than 50 wt % with respect to total monomers.

When used in that range, it is possible to use as an optical fiber that has excellent heat resistance and communication speed while maintaining good transparency.

The cladding portion may have the same composition as the cladding portion of the optical fiber A that has a core portion configured by a specific component and a cladding portion that is configured by a specific component.

Further, although, in this optical fiber, the constituent component configuring the core portion and the cladding portion may be the same composition, that is to say, have the same constituent monomers and proportion thereof, it preferably has a different composition.

Any configuration may be formed as long as the plastic covering member that covers the outer periphery of the cladding portion exhibits superior mechanical strength and obtains sufficient adhesive performance in relation to the cladding portion. In particular, when the outer periphery of the cladding portion is covered by polycarbonate, use is enabled as an optical fiber that exhibits superior flexibility while maintaining transparency and thermal resistance characteristics. The covering member is suitably formed from a plastic having a main component of polycarbonate, and a modified polycarbonate formed as a composite including polyester is preferred in view of excellent chemical resistance and flowability. Although there is no particular limitation on the thickness of the covering layer composed of the covering member, it is favorably at least 50 μm and no more than 500 μm. In this range, the requirement physical properties of the optical fiber including superior bendability, flexibility and the like can be satisfied.

With the optical fiber of the present invention, the core portion preferably includes a dopant. Adding a dopant changes the refractive index of the core portion in the optical fiber, and allows a refractive index distribution to be imparted. Among these, the refractive index preferably decreases from the center of the fiber outward in the radial direction. Providing the refractive index distribution allows communication speed to improve. In particular, adjusting the concentration distribution of the dopant in the core portion is an effective way to impart a refractive index distribution.

The cladding portion may contain a dopant.

The dopant is favorably a compound that is miscible with polymers which is the main constituting component of the core portion and/or the cladding portion, and that has a refractive index higher or lower than the refractive index of these polymers. Using a compound with good miscibility prevents turbidity in the core portion, keeps scattering loss to a minimum, and increases the distance over which communication is possible.

When a compound having a high diffractive index is used as a dopant, a diffractive index distribution in which the diffractive index decreases from the center outward in the radial direction can be achieved by adjusting the concentration distribution so that the dopant concentration decreases from the center outward in the radial direction.

When a compound having a low diffractive index is used as a dopant, a diffractive index distribution in which the diffractive index decreases from the center outward in the radial direction can be achieved by adjusting the concentration distribution so that the dopant concentration increases from the center outward in the radial direction.

Furthermore, when the dopant is formulated, two or more types of compound that exhibit a different diffractive index may be included in the formulation. In comparison to a diffractive index of the polymer that is the main constituent component of the core portion and/or the cladding portion, the two or more types of compound preferably include a compound with a high diffractive index and a compound with a low diffractive index. In comparison to a formulation containing only a compound with a high diffractive index or a compound with a low diffractive index, this type of combination of a compound with a high diffractive index and a compound with a low diffractive index enables a relative reduction in the added amount of dopant that is formulated in order to achieve the same diffractive index difference. As a result, the glass transition temperature undergoes a relative increase and therefore, the thermal resistance of the optical fiber can be improved.

Candidate dopants include a low-molecular compound, or a compound in which a hydrogen atom presents in such a compound are substituted by a deuterium atom. A low-molecular compound that has a high diffractive index includes sulfur compounds such as diphenyl sulfone (DPSO), diphenyl sulfone derivatives (e.g., chlorodiphenyl sulfone such as 4,4'-dichlorodiphenyl sulfone, 3,3',4,4'-tetrachlorodiphenyl sulfone), diphenyl sulfide (DPS), diphenyl sulfoxide, dibenzothiophene, dithiane derivative; phosphate compounds such as triphenyl phosphate (TPP), tricresyl phosphate; benzyl benzoate; benzyl n-butyl phthalate; diphenyl phthalate; biphenyl; diphenyl methane or the like. A low-molecular compound with a low diffractive index includes tris-2-ethylhexylphosfate (TOP) or the like. These can be used singly or in a combination of two or more.

In particular, DPSO, DPS, TPP and TOP are preferred. DPSO and DPS have a high diffractive index of 1.63, TPP has a high diffractive index of 1.563, whereas TOP has a low diffractive index of 1.442. Since these compounds exhibit superior compatibility with the core portion that is the main constituent component of the polymer formed from a monomer that is the main component of TCEMA, the communication speed can be improved while maintaining transparency and thermal resistance characteristics.

DPS, TPP and TOP are preferred. DPS exhibits the effect of suppressing thermal decomposition of the polymer formed from the monomer being the main component of TCEMA as a result of a thermal load during manufacture of the optical fiber. TPP and TOP enables capture of hydrochloric acid that is desorbed as a result of a thermal load.

When manufacturing is executed by use of a melt-extrusion dopant diffusion method as described below, a diffractive index distribution in which the diffractive index decreases from the center outward in a radial direction can be achieved by including a low diffractive index dopant in the cladding portion material used in the extrusion and/or including a high diffractive index dopant in the core portion material used in the extrusion.

The amount of the dopant in the core portion can be favorably adjusted according to the composition of the polymer that makes up the core portion, the intended refractive index, the refractive index of the polymer that makes up the cladding portion being used, the type of the dopant being used, and the like. For example, the center part of the core portion preferably contains about 0.1 to 25 weight parts, about 1 to 20 weight parts, and about 2 to 15 weight parts, with respect to 100 weight parts of the polymer that makes up the core portion.

The amount of the dopant in the cladding portion can be favorably adjusted according to the composition of the polymer that makes up the cladding portion, the intended refractive index, the refractive index of the polymer that makes up the core portion being used, the type of the dopant being used, and the like. For example, it preferably contains about 0 to 25 weight parts, about 0 to 20 weight parts, and about 0 to 15 weight parts, with respect to 100 weight parts of the polymer that makes up the cladding portion. In particular, when TOP is used, the amount thereof is about 0 to 25 weight parts, about 0 to 20 weight parts, and about 0 to 15 weight parts.

An amount of dopant in this range enables suitable adjustment of the diffractive index distribution of the core portion, and prevents a reduction in the Tg of the optical fiber. Furthermore, bending loss can be suppressed and the communication speed can be improved while maintaining the transparency, thermal resistance and flexibility of the optical fiber. In addition, when manufacturing the optical fiber by use of a melt-extrusion dopant diffusion method as described below, flowability during extrusion operations of the core portion material and/or the cladding portion material can be improved.

The polymers that make up the core portion and cladding portion of the optical fiber of the present invention can be manufactured by any method known in this field. For example, a mixture of the monomers constituting the polymer may be subjected to solution polymerization, bulk polymerization, emulsion polymerization, suspension polymerization, or the like. Bulk polymerization is especially desirable from the standpoint of preventing foreign matter and impurities from being admixed.

There are no particular restrictions on the polymerization temperature here, but about 80 to 150° C. are preferable. The reaction duration can be suitably adjusted according to the amounts and types of monomers, the amounts of polymerization initiator and chain transfer agent and the like as discussed below, the reaction temperature, and the like, about 20 to 60 hours are preferable.

These polymers can be manufactured simultaneously or continuously to form the core portion and/or cladding portion, as discussed below.

The polymer that makes up the core portion and/or the cladding portion is preferably not made from a monomer other than the above-mentioned TCEMA, MMA, MA, N-cHMI, cHA, TCEA, iBoA and cHMA, but may further contain a polymerizable monomer or the like to the extent that the characteristics of the resulting optical fiber are not compromised.

Examples of (meth)acrylate compounds include, for example, ethyl methacrylate, n-propyl methacrylate, n-butyl methacrylate, ethyl acrylate, n-propyl acrylate, n-butyl acrylate, pentafluorophenyl methacrylate, trifluoroethyl methacrylate, hexafluoroisopropyl methacrylate, hexafluoroisopropyl fluoroacrylate;

examples of styrene compounds include styrene, α-methyl styrene, fluorostyrene, pentafluorostyrene, chlorostyrene, blomostylene;

examples of vinyl esters include vinyl acetate, vinyl benzoate, vinyl phenyl acetate, vinyl chloroacetate;

examples of maleimides include maleimide, N-methylmaleimide, N-n-butyl maleimide, N-tert-butyl maleimide, N-isopropyl maleimide, N-phenyl maleimide;

examples of others include dicyclohexyl fumarate, acrylonitrile, 9-vinyl carbazole, methacrylate anhydride; and the deuterium substituent of these monomer.

When the polymer is produced, it is preferable to use a polymerization initiator and/or a chain transfer agent.

Examples of the polymerization initiator include a known radical initiator. Examples include, for example, peroxide compounds such as benzoyl peroxide, t-butyl peroxy-2-ethylhexanate, di-t-butyl peroxide, t-butyl peroxy isopropyl carbonate, n-butyl 4,4, bis(t-butyl peroxy) valerate; azo compounds such as 2,2'-azobis isobutyronitrile, 2,2'-azobis(2-methyl butyronitrile), 1,1'-azobis(cyclohexane-1-carbonitrile), 2,2'-azobis(2-methyl propane), 2,2'-azobis(2-methyl butane), 2,2'-azobis(2-methyl pentane), 2,2'-azobis(2,3-dimethyl butane) 2,2'-azobis(2-methyl hexane), 2,2'-azobis (2,4-dimethyl pentane), 2,2'-azobis(2,3,3-trimethyl butane), 2,2'-azobis(2,4,4-trimethyl pentane), 3,3'-azobis(3-methyl pentane), 3,3'-azobis(3-methyl hexane), 3,3'-azobis(3,4-dimethyl pentane), 3,3'-azobis(3-ethyl pentane), dimethyl-2,2'-azobis(2-methylpropionate), diethyl-2,2'-azobis(2-methylpropionate), di-t-butyl-2,2'-azo bis(2-methylpropionate). These can be used singly or in a combination of two or more.

It is suitable to use the polymerization initiator in an amount of about 0.01 to 2 wt % with respect to the total monomers.

There are no particular restrictions on the chain transfer agent, but a known chain transfer agent may be used. Examples include, for example, alkyl mercaptans (n-butyl mercaptan, n-pentyl mercaptan, n-octyl mercaptan, n-lauryl mercaptan, t-dodecyl mercaptan, etc.), thiophenols (thiophenol, m-bromothiophenol, p-bromothiophenol, m-toluenethiol, p-toluenethiol, etc.). Among these, alkyl mercaptans such as n-butyl mercaptan, n-octyl mercaptan, n-lauryl mercaptan, t-dodecyl mercaptan are preferably used. Further, the chain transfer agent wherein hydrogen atom of the C—H-binding is substituted with deuterium atom or fluorine atom may be used. These can be used singly or in a combination of two or more.

The chain transfer agent is usually used in order to adjust an appropriate molecular weight in the molding and physical properties.

The chain transfer constant of the chain transfer agent with respect to each monomer can be found experimentally by referring, for example, to the Polymer Handbook, Third Edition (edited by J. Brandrup and E. H. Immergut, published by John Wiley & Son), "Experimental Methods for Macromolecular Synthesis" (co-authored by Takayuki Ohtsu and Masaetsu Kinoshita, Kagaku Dojin, 1972), and the like. Thus, the type and added amount of the chain transfer is preferably adjusted according to the type of monomer and the like in consideration for the chain transfer constant. For example, it may be about 0.01 to 4 wt % with respect to the total monomers.

The polymer that makes up the core portion and/or cladding portion favorably have a weight average molecular weight of about 50,000 to 300,000, with a range of about 100,000 to 250,000 being preferable. This is to ensure the proper flexibility, transparency, and the like. The molecular weight of the core portion and the cladding portion may be different, for example to adjust viscosity. The weight average molecular weight indicates the polystyrene equivalent value measured by GPC (gel permeation chromatography), for example.

To the extent that the transparency, heat resistance, and other performance aspects of the optical fiber are not compromised, the polymers that make up the optical fiber of the present invention may contain as needed other additives such as a thermal stabilizer, a processing aid, a heat resistance improver, an antioxidant, a light stabilizer and the like. These can be added singly, or a combination of two or more may be used.

Examples of the heat resistance improver include, for example, a-methyl styrene and N-maleimide families.

Examples of the antioxidants include phenol-based antioxidants.

Examples of the light stabilizer include, for example, hindered amine-based light stabilizers.

Examples of how these blends are mixed with monomers or polymers include hot blending, cold blending, and solution mixing.

Any method known in this field can be utilized to manufacture the optical fiber of the present invention.

In one embodiment, interfacial gel polymerization, rotary polymerization, melt extrusion dopant diffusion, compound melt spinning, a rod-in-tube method, or the like can be utilized to form one or more layers of cladding portion around the outer periphery of one or more layers of core portion, for example.

In the manufacturing method of the optical fiber of the present invention, a preform may be obtained in advance, and then subjected to stretching, fiber drawing, or the like, but a fiber may also be formed directly by the method discussed above.

More specifically, melt extrusion method in which the core portion and cladding portion may be formed using two or more of melt extruders, a multilayer (two or more layers) die and a multilayer spinning nozzle, etc.

That is, the polymers, etc., that make up the core portion and cladding portion are each heated and melted, and injected into a multilayer die and a multilayer spinning nozzle from individual channels. Simultaneously with the extrusion molding of the core portion with this die and nozzle, one or more layers of concentric circular cladding portion are extruded around the outer periphery thereof, and the two are integrally fused together to form a fiber or a preform.

To impart a GI-type refractive index distribution in the optical fiber, in particular, at least to impart refractive index distribution in the core portion, as discussed in WO 93/08488, for instance, it is possible to employ a interfacial gel polymerization method in which the monomer compositional ratio is fixed, the dopant is added, the monomers are bulk polymerized at the polymer interface, and a concentration distribution of the dopant by means of this reaction is performed; or a rotary gel polymerization method in which a reaction mechanism for this interfacial gel polymerization is performed by rotary polymerization; a rotary polymerization method in which the monomers of different refractive indexes are supplied and the compositional ratio is steadily varied, in other words, the polymerization ratio of the front layer is controlled (the polymerization ratio is lowered), the next layer that will have a higher refractive index is polymerized, and rotary polymerization is performed so that the refractive index distribution steadily increases from the interface with the cladding portion to the center part; a rod-in-tube method in which a rod-like core portion and hollow-like cladding portion are fitted and heated to integrally fused outer face of the core portion and inner face of the cladding portion, and simultaneously, the dopant that is formulated in the core portion in advance is diffused toward the periphery and/or the dopant that is formulated in the cladding portion in advance is diffused toward the center with a heat treatment zone that is provided, and a dopant concentration distribution is imparted.

Also, examples of other methods include a melt extrusion dopant diffusion in which the core portion and cladding portion are formed using two or more melt extruders, and a multilayer such as two or more layers die and a multilayer spinning nozzle, after which the dopant that is formulated in the core portion in advance is diffused toward the periphery and/or the dopant that is formulated in the cladding portion in advance is diffused toward the center with a heat treatment zone that is provided, and a dopant concentration distribution is imparted; and a method in which polymers or the like with different dopant contents are introduced into two or more melt extruders, respectively, and the core portion and/or the cladding portion is extruded with a multilayer structure.

When forming a GI optical fiber by use of a melt-extrusion dopant diffusion method, in particular, it is preferred that the core portion is configured by a polymer as a main constituent component, in which TCEMA, and a monomer that includes at least one selected from the group consisting of MA, N-cHMI, cHA, TCEA, iBoA, and cHMA are constituting component and TCEMA is a main component. As used herein, "polymer having TCEMA as a main component is formed as the main constituent component", for example as described above, means that a polymer having TCEMA as a main component (that is to say, a polymer in which TCEMA is the largest weight in the total polymer) is the highest weight component.

When using MA, if MA is used in a range of 0 to 10 wt % (preferably 2 to 8 wt %), it is possible to suppress thermal deterioration of the polymer caused by heat during extrusion, to suitably adjust the diffractive index of the core portion, and to improve the communication speed while maintaining transparency and flexibility.

When using N-cHMI, if N-cHMI is used in a range of 0 to 20 wt % (preferably 2 to 15 wt %), it is possible to suppress thermal deterioration of the polymer caused by heat during extrusion, to suitably adjust the diffractive index of the core portion, and to improve the heat resistance while maintaining transparency and flexibility.

When using cHA, TCEA, cHMA, if cHA, TCEA, cHMA is used in a range of 0 to 10 wt % (preferably 2 to 8 wt %),respectively, it is possible to suppress thermal deterioration of the polymer caused by heat during extrusion, and to manufacture the optical fiber with excellent transparency and flexibility.

When using iBoA, if iBoA is used in a range of 0 to 10 wt % (preferably 2 to 8 wt %), it is possible to suppress thermal deterioration of the polymer caused by heat during extrusion, to rise the glass transition temperature of the core portion, and to improve the heat resistance while maintaining transparency and flexibility.

Also, when using MMA as the arbitrary component, MMA is favorably used in a range of no more than 30 wt %, preferably no more than 20 wt %. Within this range, it is possible to suitably adjust the diffractive index of the core portion, and to improve the communication speed while maintaining transparency and flexibility.

When imparting an SI or multistep diffractive index, the polymer or the like that configures the core portion or the cladding portion not containing a dopant is favorably subject to melt extrusion using a multilayer spinning nozzle and a multilayer die having at least two layers and at least two melt extruders.

When a preform of an optical fiber is formed by one of the above methods, for example, a plastic optical fiber can be produced by melt drawing this preform. This drawing is accomplished, for example, by a method in which the preform is heated and melted by being passed through interior of a heating furnace or the like, after which it is drawn and spun. The heating temperature can be favorably determined according to the material of the preform and so forth. An example is about 180 to 250° C. The drawing conditions (drawing temperature, etc.) can be favorably adjusted taking into account the diameter of the preform to be obtained, the diameter of the desired optical fiber, the materials being used, and so on.

Thermal processing may be executed at an arbitrary stage. Thermal processing enables diffusion of the dopant toward the peripheral portion or the central portion of the optical fiber or a preform. The conditions here (such as the temperature, duration, pressure, and atmosphere composition) are preferably adjusted favorably.

The optical fiber of the present invention can be put to use directly in this form. Alternatively, its outer periphery can be covered with one or more resin layers, fiber layers, metal wire, or the like, and/or a plurality of fibers can be bundled, allowing application to a variety of different applications such as optical fiber cables.

There are no particular restrictions on the resin for covering the optical fiber, but it is preferable to select one satisfying the strength, flame retardance, flexibility, chemical resistance, heat resistance necessary for optical fiber cables. Examples thereof include a resin containing a vinyl chloride resin, a chlorinated vinyl chloride resin, a chlorinated polyethylene resin, a polyethylene resin, an acryl resin, a fluoric resin, a polycarbonate resin, a nylon resin, a polyester resin, an ethylene-vinyl acetate copolymer, an ethylene-vinyl acetate copolymer, a vinyl chloride-ethylene-vinyl acetate copolymer, a vinyl acetate-vinyl chloride copolymer, or the like as a main component. In addition, a composition in which the additive described above is added to these resin may be used.

Examples of the fiber include aramid fiber, polyester fiber and polyamide fiber.

Examples of the metal wire include a stainless steel wire, a zinc alloy wire and a copper wire.

There are no particular restrictions on the method for covering the outer periphery of the optical fiber with resin, but an example is to extrude a covering onto the top layer after the optical fiber has been formed.

A cable in which an optical fiber is used is preferably securely fixed to a jack using a connecting optical plug at the end. Connectors made up of a plug and a jack that can be used include PN type, SMA type, SMI type, F05 type, MU type, FC type, SC type, and various other such commercially available connectors. Or, rather than using a connecting plug at the end of a cable featuring an optical fiber, an OptoLock (trade name of Firecomms) or another such plugless connector may be attached to the connected device side such as a media converter, and a cut-off cable can be inserted and connected.

Examples of the optical fiber of the present invention will now be described in detail, but the present invention is not limited to or by the following examples.

Example 1

Preparation of Fiber: A Rod-in-Tube Method was Used to Prepare an Optical Fiber.

Refined TCEMA and diphenyl sulfide (hereinafter referred to as "DPS") as a dopant were mixed at a weight ratio of TCEMA:DPS=100:4. Then, di-t-butyl peroxide as a polymerization initiator and n-lauryl mercaptan as a chain transfer agent were added to have an overall weight concentration respectively of 0.03 wt % and 0.2 wt %. Thereafter, filtering was performed using a membrane filter having pores of 0.2 µm.

The filtrate was introduced into a glass polymerization container, dissolved air was removed using a freeze-pump method, and a vacuum seal was applied. The temperature of the polymerization container was maintained at 120° C., and polymerization of the monomer was executed over 40 hours to thereby obtain a core portion material rod with an external diameter of 10 mm.

Refined TCEMA and MMA were mixed at a weight ratio of TCEMA:MMA=20:80. Then, benzoyl peroxide as a polymerization initiator and n-butyl mercaptan as a chain transfer agent were added to have an overall weight concentration respectively of 0.5 wt % and 0.3 wt %. Thereafter, filtering was performed using a membrane filter having pores of 0.2 µm.

The filtrate was introduced into a glass polymerization container. While the polymerization container was rotated at high speed in a circumferential direction (approximately 2500 rpm), polymerization of the monomer was executed over 20 hours at 70° C. and then a further 20 hours at 90° C. to thereby obtain a hollow tube with an external diameter of 20 mm and an internal diameter of 10.5 mm.

The resulting core portion material rod and the cladding portion material hollow tube were cut to the same length, washed in distilled water, fitted and covered with a heat shrinkage tube. Thereafter, a GI pre-form was obtained by heating for 5 hours at 180° C. under vacuum conditions.

The resulting pre-form was inserted in a downward vertical orientation into a heating furnace adjusted to 250° C. to thereby obtain a melt-extended GI plastic optical fiber.

The fiber external diameter was approximately 600 µm, and control was performed by adjusting the haul-off speed.

The fiber produced was subjected to the following measurement and testing.

Loss measurement: The transmission loss at 665 nm was measured by cut-back method.

Bandwidth measurement: The transmission bandwidth at 650 nm and with restricted-mode launch using a quartz multimode fiber with a core diameter of 50 µm was measured for the 50 m-fiber.

Winding test: The increase in transmission loss was measured after relaxing from a state in which the fiber was winded five times around a rod having 10 mm-diameter according to JIS 6823, which is the increase in transmission loss after relaxing with respect to before winding. In the table 1, "broken" means that there was not transmission light measured after relaxing.

Glass transition temperature (Tg) measurement: Samples were taken from the core portion material lods, and the Tg thereof was measured by DSC method at a temperature rising rate of 10° C./min and under a nitrogen atmosphere.

These results are given in Table 1-2.

Examples 2 to 26 and Comparative Examples 1 to 3

As shown in Table 1-1 and 1-2, other than changing the monomer components of the core portion and the cladding portion, kinds of the dopant compounds and the ratio, optical fibers were produced and evaluated just as in Example 1.

Example 27

Preparation of Fiber: A Melt-Extrusion Dopant Diffusion Method is Used to Prepare an Optical Fiber.

Refined TCEMA and MA were mixed with DPS as a dopant using a weight ratio of TCEMA:MA:DPS=95:5:10. Then, di-t-butyl peroxide as a polymerization initiator and n-lauryl mercaptan as a chain transfer agent were added to have an overall weight concentration respectively of 0.03 wt % and 0.2 wt %. Thereafter, filtering was performed using a membrane filter having pores of 0.2 µm. The mixed liquid was subjected to reduced-pressure deaeration while applying ultrasonic waves, was introduced into a polymerization container, and while the temperature of the polymerization container was maintained at 120° C., polymerization of the monomer was executed over 40 hours to thereby obtain a core portion material rod (external diameter of 30 mm).

Refined TCEMA and MA were mixed using a weight ratio of TCEMA:MA=95:5. Then, di-t-butyl peroxide as a polymerization initiator and n-lauryl mercaptan as a chain transfer agent were added to have an overall weight concentration respectively of 0.03 wt % and 0.2 wt %. Thereafter, filtering was performed using a membrane filter having pores of 0.2 µm. The mixed liquid was subjected to reduced-pressure deaeration while applying ultrasonic waves, was introduced into a polymerization container, and while the temperature of the polymerization container is maintained at 120° C., polymerization of the monomer was executed over 40 hours to thereby obtain a cladding member rod (external diameter of 30 mm).

The resulting core portion material rod and cladding portion material rod were used to form a core portion and a laminated covering shape for the cladding portion by use of separate extruders and a double-layer die connected to the extruders. Then the dopant contained in the core portion was diffused into the cladding portion by passing for a predetermined period in a heating passage.

XYLEX X7300CL (Product Name, manufactured by SABIC Innovative Plastics, polyester-modified polycarbonate) (hereinafter referred to as "PC") as an overcladding was melted using another extruder, and the outermost peripheral section was covered using a double-layered die by merging the passages containing the melt flow of the core portion and cladding portion. The molten resin discharged from the die outlet was taken up to thereby obtain a GI-type plastic optical fiber having a core portion diameter, cladding portion diameter and fiber external diameter respectively of 200 µm, 280 µm and 750 µm. The resulting optical fiber sample was evaluated in the same manner as Example 1.

Examples 28 to 42 and Comparative Example 4

As shown in Table 1-1 and 1-2, other than changing the monomer components of the core portion and the cladding portion, kinds of the dopant compounds and the ratio, optical fibers were produced and evaluated just as in Example 27.

These results are given in Table 1-2.

TABLE 1-1

| | Core portion | | | | | | |
|---|---|---|---|---|---|---|---|
| | TCEMA | Copolymer's Monomer | | Copolymer's Monomer | | Dopant | |
| Ex. | wt % | Comp. | wt % | Comp. | wt % | Comp. | parts by wt. |
| 1 | 100 | | | | | DPS | 4 |
| 2 | 100 | | | | | DPS | 4 |
| 3 | 100 | | | | | DPS | 4 |
| 4 | 100 | | | | | DPS | 4 |
| 5 | 100 | | | | | DPS | 10 |
| 6 | 100 | | | | | | |
| 7 | 95 | MMA | 5 | | | DPS | 4 |
| 8 | 95 | MA | 5 | | | DPS | 4 |
| 9 | 95 | MA | 5 | | | TPP | 4 |
| 10 | 95 | MA | 5 | | | DPSO | 4 |
| 11 | 95 | cHA | 5 | | | TPP | 4 |
| 12 | 95 | TCEA | 5 | | | TPP | 4 |
| 13 | 95 | iBoA | 5 | | | DPS | 4 |
| 14 | 95 | cHMA | 5 | | | DPS | 4 |
| 15 | 95 | MA | 5 | | | DPS | 4 |
| 16 | 95 | MA | 5 | | | TPP | 4 |
| 17 | 95 | cHA | 5 | | | TPP | 4 |
| 18 | 95 | TCEA | 5 | | | TPP | 4 |
| 19 | 95 | iBoA | 5 | | | TPP | 4 |
| 20 | 95 | cHMA | 5 | | | TPP | 4 |
| 21 | 95 | N-cHMI | 5 | | | DPS | 4 |
| 22 | 90 | N-cHMI | 10 | | | DPS | 4 |
| 23 | 85 | N-cHMI | 15 | | | TPP | 10 |
| 24 | 80 | MMA | 20 | | | DPS | 4 |
| 25 | 80 | MMA | 20 | | | DPS | 4 |
| 26 | 76 | MMA | 24 | | | DPS | 4 |
| 27 | 95 | MA | 5 | | | DPS | 10 |
| 28 | 95 | MA | 5 | | | TPP | 10 |
| 29 | 95 | MA | 5 | | | TPP | 8 |
| 30 | 95 | MA | 5 | | | DPSO | 10 |
| 31 | 95 | cHA | 5 | | | DPS | 8 |
| 32 | 95 | TCEA | 5 | | | DPS | 8 |
| 33 | 95 | iBoA | 5 | | | DPS | 8 |
| 34 | 95 | cHMA | 5 | | | DPS | 8 |
| 35 | 95 | MA | 5 | | | DPS | 10 |
| 36 | 72 | MMA | 23 | MA | 5 | DPS | 8 |
| 37 | 95 | N-cHMI | 5 | | | DPS | 8 |
| 38 | 95 | N-cHMI | 5 | | | DPS | 8 |
| 39 | 95 | N-cHMI | 5 | | | TPP | 8 |
| 40 | 90 | N-cHMI | 10 | | | DPS | 8 |
| 41 | 85 | N-cHMI | 15 | | | TPP | 13 |
| 42 | 95 | N-cHMI | 5 | | | DPS | 8 |
| Comp. Ex. | | | | | | | |
| 1 | 100 | | | | | DPS | 10 |
| 2 | 60 | MMA | 40 | | | DPS | 4 |
| 3 | 100 | | | | | DPS | 4 |
| 4 | 60 | MMA | 35 | MA | 5 | DPS | 4 |

TABLE 1-2

| | Cladding portion | | | | | | Over cladding | 665 nm Loss (dB/km) | Bandwidth 50 m · 650 nm (GHz) | Wrapping test (dB) | Core portion Tg(° C.) |
|---|---|---|---|---|---|---|---|---|---|---|---|
| | TCEMA | MMA | TFEMA | Copolymer's Monomer | | Dopant | | | | | |
| Ex | wt % | | | Comp. | wt % | Comp. | parts by wt | | | | |
| 1 | 20 | 80 | | | | | — | 88 | 1.0 | 0.1 | 102 |
| 2 | 5 | 95 | | | | | — | 90 | 0.9 | 0 | 102 |
| 3 | | 100 | | | | | — | 87 | 0.8 | 0 | 102 |
| 4 | 30 | 70 | | | | | — | 89 | 1.1 | 0.1 | 102 |
| 5 | 70 | 30 | | | | | — | 93 | 1.3 | 0.2 | 80 |
| 6 | | 100 | | | | | — | 84 | 0.4 | 0.1 | 119 |
| 7 | | 100 | | | | | — | 123 | 0.9 | 0 | 101 |
| 8 | | 100 | | | | | — | 135 | 1.0 | 0 | 103 |
| 9 | | 100 | | | | | — | 110 | 1.0 | 0 | 101 |
| 10 | | 100 | | | | | — | 137 | 1.0 | 0 | 103 |
| 11 | | 100 | | | | | — | 100 | 1.0 | 0 | 102 |
| 12 | | 100 | | | | | — | 98 | 0.9 | 0 | 98 |
| 13 | | 100 | | | | | — | 103 | 0.9 | 0 | 109 |
| 14 | | 100 | | | | | — | 98 | 0.9 | 0 | 95 |
| 15 | 76 | 24 | | | | | — | 135 | 2.0 | 0.2 | 103 |
| 16 | 48 | 48 | | MA | 4 | | — | 139 | 1.4 | 0.1 | 101 |
| 17 | 48 | 48 | | cHA | 4 | | — | 104 | 1.4 | 0.1 | 102 |
| 18 | 48 | 48 | | TCEA | 4 | | — | 102 | 1.4 | 0.1 | 98 |
| 19 | 48 | 48 | | iBoA | 4 | | — | 107 | 1.4 | 0.1 | 107 |
| 20 | 48 | 48 | | cHMA | 4 | | — | 102 | 1.4 | 0.1 | 93 |
| 21 | | | | N-cHMI | 5 | | — | 119 | 1.0 | 0 | 116 |
| 22 | | | | N-cHMI | 10 | | — | 140 | 1.0 | 0 | 126 |
| 23 | | | | N-cHMI | 15 | | — | 158 | 0.9 | 0.1 | 118 |
| 24 | 5 | 95 | | | | | — | 152 | 1.1 | 0 | 99 |
| 25 | | 100 | | | | | — | 149 | 1.0 | 0 | 99 |
| 26 | 50 | 50 | | | | | — | 148 | 1.7 | 0.2 | 98 |
| 27 | | 95 | | MA | 5 | | PC | 145 | 1.8 | 0.1 | 91 |
| 28 | | 95 | | MA | 5 | | PC | 119 | 1.8 | 0.1 | 85 |
| 29 | | 95 | | MA | 5 | TOP | 8 | PC | 114 | 1.5 | 0 | 90 |
| 30 | | 95 | | MA | 5 | | PC | 148 | 1.8 | 0.1 | 91 |
| 31 | | 95 | | cHA | 5 | TOP | 8 | PC | 104 | 1.5 | 0 | 97 |
| 32 | | 95 | | TCEA | 5 | TOP | 8 | PC | 102 | 1.5 | 0.1 | 93 |
| 33 | | 95 | | iBoA | 5 | TOP | 8 | PC | 107 | 1.5 | 0.1 | 100 |
| 34 | | 95 | | cHMA | 5 | TOP | 8 | PC | 102 | 1.5 | 0 | 87 |

TABLE 1-2-continued

| | Cladding portion | | | | | | | | 665 nm | Bandwidth | Wrapping | Core |
|---|---|---|---|---|---|---|---|---|---|---|---|---|
| | TCEMA | MMA | TFEMA | Copolymer's Monomer | | Dopant | parts by | Over | Loss | 50 m · 650 nm | test | portion |
| Ex | wt % | | | Comp. | wt % | Comp. | wt | cladding | (dB/km) | (GHz) | (dB) | Tg(° C.) |
| 35 | 72 | 23 | | MA | 5 | | | PC | 145 | 1.4 | 0 | 91 |
| 36 | 72 | 23 | | MA | 5 | | | PC | 164 | 2.0 | 0 | 94 |
| 37 | 95 | | | N-cHMI | 5 | | | PC | 124 | 2.0 | 0.1 | 106 |
| 38 | 95 | | | N-cHMI | 5 | TOP | 8 | PC | 123 | 1.6 | 0.1 | 106 |
| 39 | 95 | | | N-cHMI | 5 | TOP | 8 | PC | 123 | 1.6 | 0.1 | 105 |
| 40 | 90 | | | N-cHMI | 10 | TOP | 8 | PC | 141 | 1.6 | 0.2 | 113 |
| 41 | 85 | | | N-cHMI | 15 | TCP | 13 | PC | 155 | 1.1 | 0.2 | 110 |
| 42 | 72 | 23 | | N-cHMI | 5 | | | PC | 126 | 1.7 | 0 | 106 |
| Comp. Ex. | | | | | | | | | | | | |
| 1 | 100 | | | | | | | — | 95 | 1.8 | Broken | 80 |
| 2 | | 100 | | | | | | — | 218 | 1.2 | 0 | 96 |
| 3 | | | 100 | | | | | — | 88 | 0.1 | 0 | 102 |
| 4 | 50 | 40 | | MA | 10 | | | PC | 250 | 2.0 | 0 | 101 |

In the table, TFEMA means tetrafluoro etylmethacrylate.

INDUSTRIAL APPLICABILITY

The present invention is useful as a constituent element of optical fibers and optical fiber cables intended to be used for high-speed communication, and by varying the shape, can be applied as an optical component such as an optical waveguide or other such light conducting element; a lens used for a still camera, a video camera, a telescope, eyeglasses, soft contact lenses, a solar light collector, and so forth; a mirror such as a concave mirror or a polygon mirror; or a prism such as a pentaprism.

The invention claimed is:

1. An optical fiber configured from a core portion and a cladding portion disposed on an outer periphery of the core portion,
    wherein the core portion is formed by a main constituent component of a polymer of monomers that include at least 70 wt % of trichloroethyl methacrylate (TCEMA),
    the cladding portion is formed by a main constituent component of a polymer of monomers which include at least 20 wt % of methyl methacrylate (MMA).

2. An optical fiber according to claim 1, wherein the core portion is formed by a main constituent component of a polymer of structural units that are derived from TCEMA and at least one monomer selecting from the group consisting of methyl methacrylate (MMA), methyl acrylate (MA), N-cyclohexyl maleimide (N-cHMI), cyclohexyl acrylate (cHA), trichloroethyl acrylate (TCEA), isobornyl acrylate (iBoA) and cyclohexyl methacrylate (cHMA).

3. An optical fiber according to claim 1, wherein the cladding portion is formed by a main constituent component of a polymer of structural units that are derived from MMA and at least one monomer selecting from the group consisting of TCEMA, MA, N-cHMI, cHA, TCEA, iBoA and cHMA.

4. An optical fiber according to claim 1, wherein the core portion include a dopant and has a diffractive index distribution.

5. An optical fiber according to claim 4, wherein the dopant includes one or more selecting from the group consisting of diphenyl sulfide (DPS), triphenyl phosphate (TPP), diphenyl sulfone (DPSO) and tris-2-ethylhexylphosfate (TOP).

* * * * *